United States Patent [19]

Kurashima

[11] Patent Number: 4,847,798
[45] Date of Patent: Jul. 11, 1989

[54] CASE STRUCTURE FOR AN ELECTRONIC APPARATUS, AND DEFORMABLE ORNAMENTAL BODY THEREFOR

[75] Inventor: Isao Kurashima, Tokyo, Japan

[73] Assignee: Casio Computer Co., Ltd., Tokyo, Japan

[21] Appl. No.: 270,394

[22] Filed: Nov. 10, 1988

Related U.S. Application Data

[63] Continuation of Ser. No. 907,669, Sep. 15, 1986, abandoned.

[30] Foreign Application Priority Data

| Sep. 20, 1985 | [JP] | Japan | 60-208112 |
| Sep. 20, 1985 | [JP] | Japan | 60-208113 |
| Sep. 20, 1985 | [JP] | Japan | 60-208114 |
| Sep. 20, 1985 | [JP] | Japan | 60-208115 |

[51] Int. Cl.⁴ ............................................. G06F 1/00
[52] U.S. Cl. ................................................... 364/708
[58] Field of Search .................. 364/708; 235/1 D; 368/88

[56] References Cited

U.S. PATENT DOCUMENTS

| 4,074,118 | 2/1978 | Washizuka et al. | 364/708 |
| 4,096,577 | 6/1978 | Ferber et al. | 364/708 |
| 4,158,230 | 6/1979 | Washizuka et al. | 364/708 |
| 4,189,912 | 2/1980 | Washizuka et al. | 364/708 |
| 4,197,586 | 4/1980 | Nidiffer | 364/708 |
| 4,209,735 | 6/1980 | Yoshida | 364/708 |
| 4,231,098 | 10/1980 | Tanimoto | 364/708 |
| 4,517,660 | 5/1985 | Fushimoto et al. | 364/708 |
| 4,627,736 | 12/1986 | Komaki | 368/88 |

FOREIGN PATENT DOCUMENTS 53-2927 12/1978 Japan.

*Primary Examiner*—David H. Malzahn
*Attorney, Agent, or Firm*—Frishauf, Holtz, Goodman & Woodward

[57] ABSTRACT

Disclosed is a miniature electronic apparatus, in which input information and a result of calculation of input information performed by an integrated circuit in accordance with key-input signals, is indicated on a display panel. In this apparatus, an IC chip and the display panel are contained in an apparatus cover member, of which lower and upper parts are formed integrally by injection molding. The upper part has a number of key-operation portions, and serves also as an upper cover. The upper part is formed of a main body of soft, transparent thermoplastic elastomer resin, an ornament layer on the body, and a soft, transparent resin coating layer, covering the ornament layer. Thus, according to this electronic apparatus, the components used can be reduced in number, and assembled efficiently. Also, the apparatus can have a specially attractive and gorgeous appearance, different from those of conventional miniature electronic apparatuses.

11 Claims, 16 Drawing Sheets

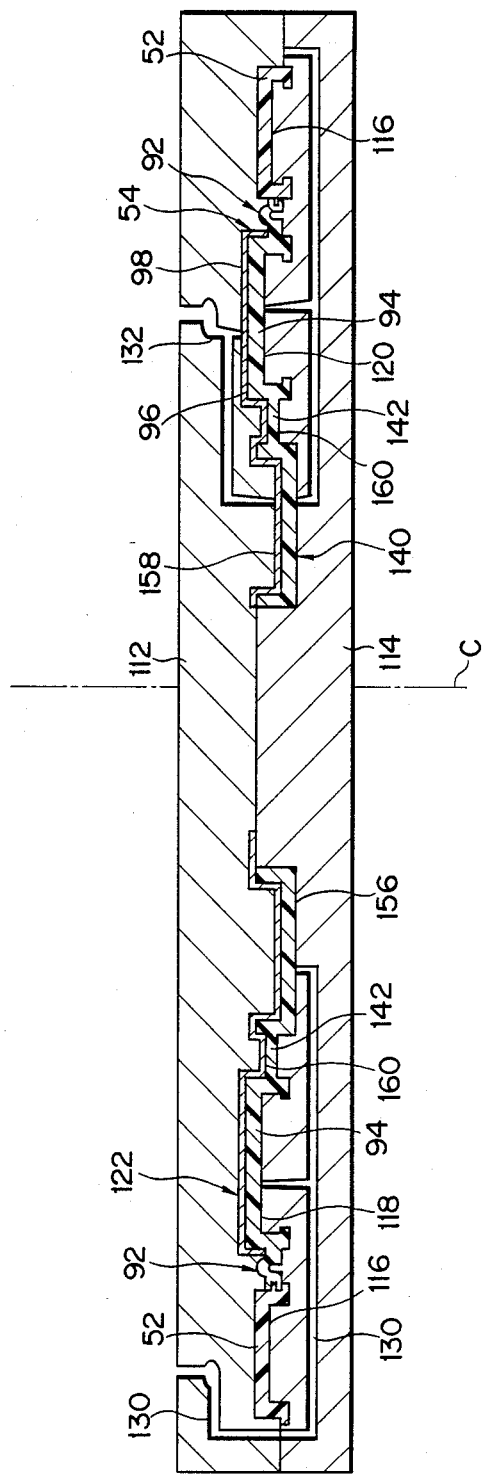

CASE STRUCTURE FOR AN ELECTRONIC APPARATUS, AND DEFORMABLE ORNAMENTAL BODY THEREFOR

BACKGROUND OF THE INVENTION

The present invention relates to a miniature electronic apparatus having a keyboard, and to a soft ornament adapted thereto.

In miniature electronic apparatuses, such as miniature electronic calculators, the number of components used can be reduced, thus lowering the manufacturing costs, by using a casing member as mounting means for various components therein, or by forming part of an electronic circuit directly on the casing member.

A casing member of one such prior art miniature electronic calculator is stated in U.S. Pat. No. 4,231,098. In this case, wires for an electronic circuit are arranged directly on the casing member, to reduce the number of wiring boards. Since the wiring for the electronic circuit of the miniature electronic calculator is highly complicated, only part of it can be formed on the casing member.

In a miniature electronic calculator stated in Japanese Utility Model Disclosure No. 53-2927, a main casing contains principal components of the calculator, and a protector casing serves to protect, against external force, exposed elements, such as key buttons on the main casing, and display means for indicating the progress and results of calculation. These two casings are formed integrally, thus eliminating mounting members used to join the casings together, and improving the manufacturing and assembling efficiency. Also in this conventional calculator, however, the number of components of the main casing itself cannot be reduced at all.

SUMMARY OF THE INVENTION

An object of the present invention is to provide a miniature electronic apparatus, in which part of a casing member constitutes key-operation portions, thus permitting a reduction in the number of components in the casing member, and simplification of the general construction of the apparatus.

Another object of the invent on is to provide a soft ornament, capable of imparting a gorgeous appearance to the key-operation portions of the casing member, in the miniature electronic apparatus of the aforementioned construction.

The first object of the invention is achieved by a miniature electronic apparatus comprising: cover member having a lower cover part formed by injection molding, an upper cover part formed by injection molding and which houses electronic components, including display means and an IC chip, in cooperation with said lower cover part, the outer surface of said upper cover part being formed with a plurality of projections for key input, the inner surface of said upper cover part being formed with a plurality of depressions in relation to said projections for key input, respectively, each one of said depressions being formed with a projection projecting toward the opening of said depression, and a connecting portion formed by injection molding so as to connect said upper cover part and said lower cover part; a plurality of movable contacts located in said cover member so as to be in relation to said projection in said depressions of said upper cover part; and a plurality of fixed contacts located in said cover member so as to be in relation to said movable contacts.

The first object of the invention is also achieved by a miniature electronic apparatus comprising: a printed-circuit board unit including a printed-circuit board, on which an IC chip, display means, and a plurality of first key contacts are mounted; a lower cover part which covers one side surface of said printed-circuit board unit and has engaging means; an upper cover part which covers the other side surface of said printed-circuit board unit, has engaged means for engagement with said engaging means of said lower cover part, and constructs, in cooperation with said lower cover part, a cover member for covering said printed-circuit board unit and has engaging means; an upper cover part being formed with a plurality of projections for key input, the inner surface of said lower cover part being formed with a plurality of depressions in relation to said projection for key input, each one of said depressions being formed with a projection projecting toward the opening of said depressions; a protector cover for covering the outer surface of said upper cover part; and a plurality of second key contacts which are located in said cover member so as to be in relation to said first key contacts of said printed-circuit board unit, and operate, in cooperation with said first key contacts, on/off control for said IC chip and display means; wherein said protector cover is integrally formed, by injection molding, with said upper cover part so as to be movable between a closed position, where said protector cover covers the outer surface of said upper cover part, and an open position, where said protector cover separates from the outer surface of said upper cover part.

The first object of the invention is further achieved by a miniature electronic apparatus comprising: a printed-circuit board unit including a printed-circuit board, on which an IC chip, display means, and a plurality of first key contacts are mounted; a lower cover part which covers one side surface of said printed-circuit board unit, and has engaging means; an upper cover part which covers the other side surface of said printed-circuit board unit, has engaged means for engagement with said engaging means of said lower cover part, and constructs, in cooperation with said lower cover part, a cover member for covering said printed-circuit board unit, the outer surface of said upper cover part being formed with a plurality of projections for key input, the inner surface of said lower cover part being formed with a plurality of depressions in relation to said projection for key input each one of said depressions being formed with a protection projecting toward the opening of said depressions; a protector cover for covering the outer surface of said upper cover part; and a plurality of second key contacts which are located in said cover member so as to be in relation to said first key contacts of said printed-circuit board unit, and operate, in cooperation with said first key contacts, on/off control for said IC chip and display means; wherein said protector cover is integrally formed, by injection molding, with said lower cover part so as to be movable between a closed position, where said protector cover covers the outer surface of said upper cover part, and an open position, where said protector cover separates from the outer surface of said upper cover part, when sad upper and lower cover parts are engaged with each other.

The second object of the invention is achieved by a soft ornament adapted to a miniature electronic apparatus, which comprises a first light-transmitting elastomer layer formed of a soft material; a colored ornament layer laminated on the first elastomer layer; and a second light-transmitting elastomer layer laminated on the ornament layer so as to cover the ornament layer.

BRIEF DESCRIPTION OF THE DRAWINGS

FIG. 26 is a sectional view schematically illustrating part of a process for manufacturing the integrally connected protector cover and upper and lower cover parts, in the calculator of FIG. 22.

DETAILED DESCRIPTION OF THE PREFERRED EMBODIMENTS

Several embodiments of the present invention will now be described in detail with reference to the accompanying drawings.

Figure 1:
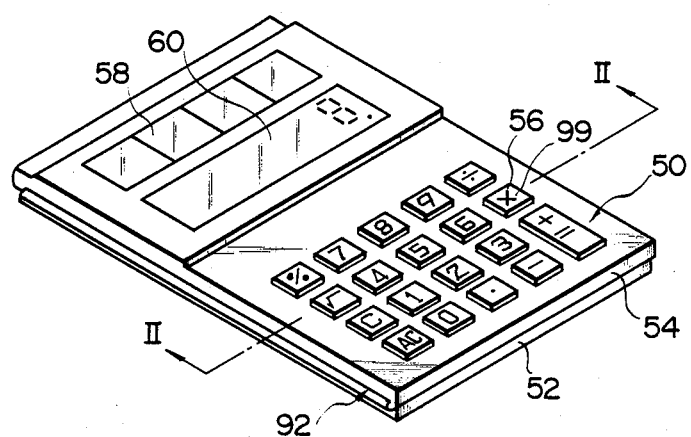
FIG. 1 is a perspective view showing an outline of a miniature electronic calculator according to a first embodiment of the present invention.

A miniature electronic calculator, as shown in FIG. 1, comprises a printed-circuit board unit, incorporating electronic components, such as an IC (integrated circuit) chip, liquid crystal display means, etc., and cover member 50 containing the substrate unit. Member 50 is formed of lower and upper cover parts 52 and 54. A plurality of key buttons 56 (key operation portions) and transparent windows 58 and 60, for solar cell and liquid crystal display means, respectively, are arranged on the upper surface of cover part 54.

Figure 2:
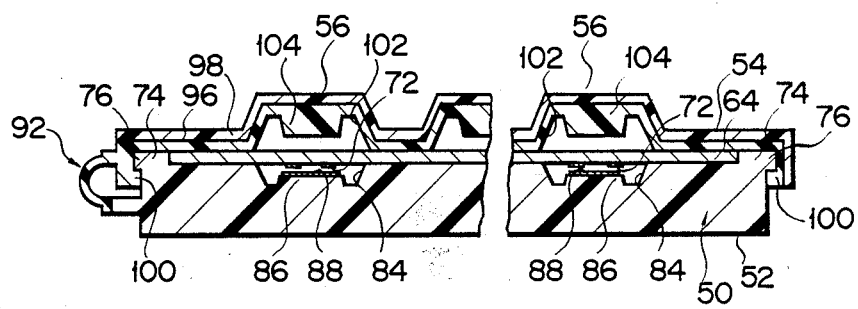
FIG. 2 is a sectional view taken along line II-II of FIG. 1.
Figure 3:
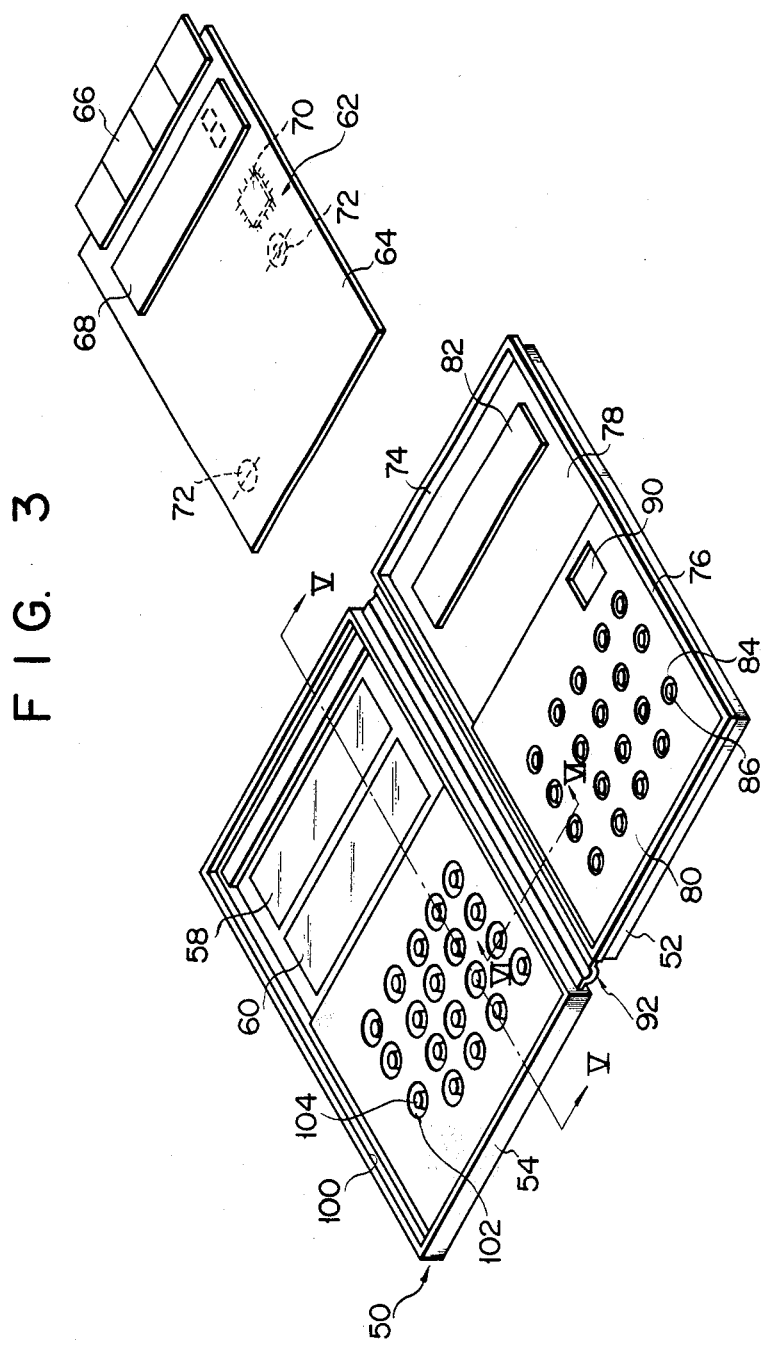
FIG. 3 is an exploded perspective view of the calculator of FIG. 1.
Figure 4:
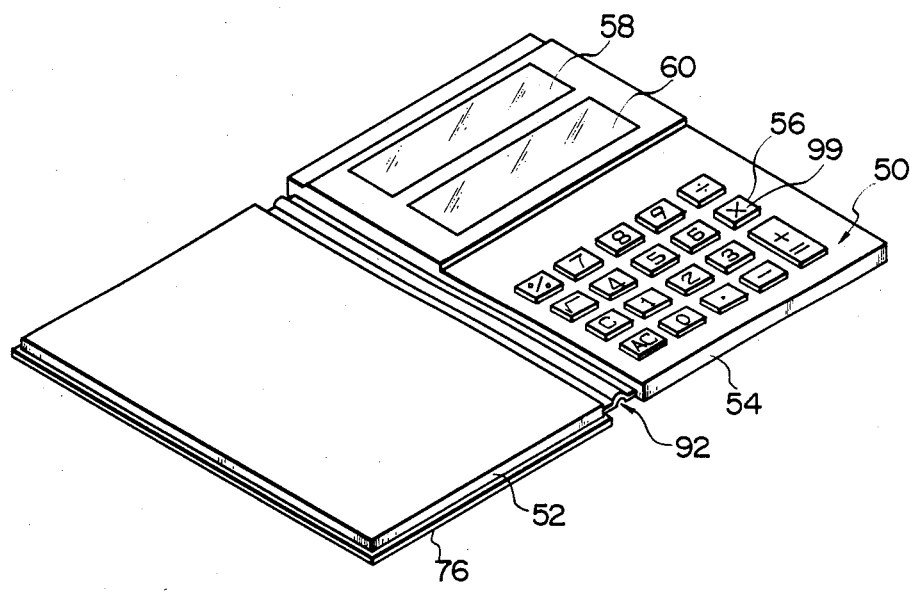
FIG. 4 is a perspective view showing the outer surfaces of a protector cover and an upper cover part, both covers being integrally combined with each other.

Referring now to FIGS. 2 through 4, the construction of the miniature electronic calculator will be described further in detail.

As shown in FIG. 3, printed-circuit board unit 62, in cover member 50, comprises printed-circuit board 64 formed of a rectangular flexible material, solar cell 66 disposed along the upper edge of board 64, liquid crystal display means 68 in an opening formed in board 64, right under cell 66, and LSI (large-scale integrated circuit) chip 70 fixed to the lower surface of board 64, in close vicinity to display means 68. Unit 62 further comprises a plurality of split-type movable contacts 72 arranged on the lower surface of board 64, and a pattern wiring (not shown), formed on board 64 and electrically connecting cell 66, display means 68, chip 70, and contacts 72. Movable contacts 72, only two of which are shown in FIG. 3, are as many as key buttons 56 on upper cover part 54. The respective upper surfaces of cell 66 and display means 68 are substantially flush with each other. Contacts 72 are arranged on board 64 so that they correspond individually to buttons 56 of cover member 50 when board 64 is set in member 50.

Lower cover part 52 of cover member 50 is made of rigid synthetic resin, such as polystyrene or ABS (acrylonitrile-butadiene-styrene, resin. Part 52 is formed with wall 74, which exteids along the peripheral edge of part 52. Outward protrusion 76 (FIGS. 2 and 4) is formed continuously with the projecting end of wall 74.

In the inner surface of a flat portion of lower cover part 52, surrounded by wall 74, region 78, which corresponds to solar cell 66 and liquid-crystal display means 68 on board 64 when board 64 is housed in cover member 50, is deeper than region 80 corresponding to key buttons 56 and LSI chip 70. From deeper region 78 protrudes cell supporting portion 82 which is adapted to support solar cell 66 on board 64 Shallower region 80 is formed with a plurality of circular depressions 84, which correspond individually to split-type movable contacts 72 on board 64 when the substrate is set in cover member 50. Each depression 84 is formed, on its bottom surface, with cylindrical projection 86 which has a flat top end face. The height of projections 86 is less than the depth of depressions 84. Fixed contact 88, made of carbon, is formed on the top end face of each projection 86, by hot stamping. Shallower region 80 is further provided with depression 90, which corresponds to LSI chip 70 on board 64 when the substrate is set in member 50. One side of lower cover part 52 is connected to one side of upper cover part 54, by means of bendable connecting portion 92.

Figure 5:
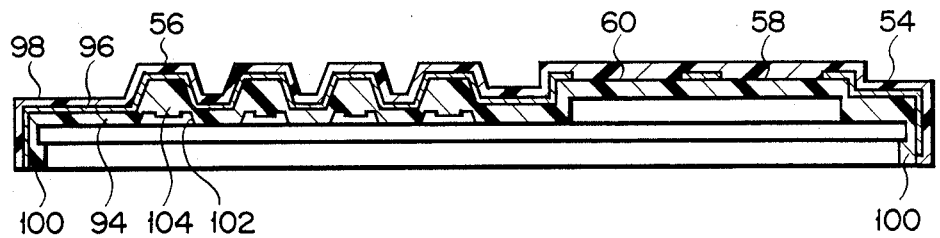
FIG. 5 is a sectional view taken along line V—V of FIG. 3.

As shown in detail in FIG. 5]upper cover part 54 is formed of synthetic rubber, such as urethane rubber, or elastomer material, such as thermoplastic elastomer resin. It has transparent, elastic body 94. Thermoplastic elastomer resins permit injection molding, and exhibit elasticity, like rubber materials, after they are molded. They can be classified into several groups, including olefin, styrene, urethane, and polyester resins. As an example of such thermoplastic elastomer resins, there is *HAITORELU* (trademark), produced by Toray-Du Pont Co., Ltd. of Japan. The upper surface of body 94 is covered with ornament layer 96, except the regions corresponding to transparent windows 58 and 60 for solar cell and liquid crystal display means. Also, the whole upper surface of layer 96 is covered with transparent protection layer 98 for protecting the ornament layer. Layer 96 includes symbol marks 99 (see FIGS. 1 and 4) and a background layer 99a (see FIG. 8) on the top end faces of body 94. Marks 99 correspond in function to buttons 56, individually.

As shown in detail in FIGS. 2 and 3, the inner plane surface of upper cover part 54 is formed with inward protrusion 100, extending along the peripheral edge of part 54. Inward protrusion 100 is adapted to engage outward protrusion 76 formed on the peripheral edge of lower cover part 52. Also, the inner surface of upper cover part 54 is formed with depressions 102, in positions corresponding individually to key buttons 56. Each depression 102 is formed, on its bottom surface, with projection 104 which has a f]at top end face. The height of projections 104 is less than the depth of depressions 102.

Figure 6:
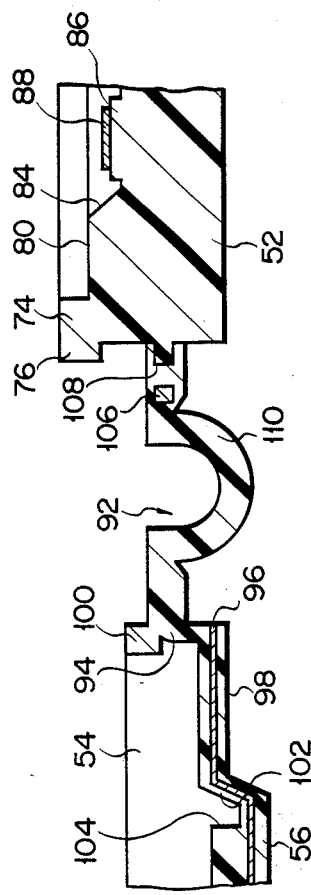
FIG. 6 is a sectional view taken along line VI—VI of FIG. 3.

FIG. 6 is an enlarged sectional view showing a region around connecting portion 92, which connects lower and upper cover parts 52 and 54. Portion 92 includes connecting strip 106 formed along the one side of part 52. A plurality of through holes 108 are formed in strip 106, so as to be arranged a long one side of the strip. Portion 92 further includes outwardly extending strip 110, which also extends along one side of body 94 of upper cover part 54. The outwardly extending end portion of strip 110 covers connecting strip 106 of lower cover part 52, so as to fill up holes 108. The connection of strip 106 of lower cover part 52 and the extending end of strip 110 of upper cover part 54, is made at the time of integral molding of body 94 of upper cover part 54.

In assembling the miniature electronic calculator according to a first embodiment of the invention, which is constructed in the aforesaid manner, printed-circuit board unit 62, previously mounted with solar cell 66, liquid crystal display means 68, LSI chip 70, split movable contacts 72, and the pattern wiring, is first set on the inner surface of lower cover part 52, which is previously connected to upper cover part 54 by means of connecting portion 92. Then, connecting portion 92 is bent so that part 54 covers unit 62 on part 52. Finally, as shown in FIG. 2, inward protrusion 100 of part 54 is caused to engage outward protrusion 76 of part 52, and parts 54 and 52 are bonded together.

In the miniature electronic calculator according to the first embodiment, constructed in this manner, when one of key buttons 56 is depressed, it is deformed and lowered. As a result, projection 104 of the depressed button lowers its corresponding movable contact 72 of printed-circuit board unit 2. The lowered movable contact abuts against fixed contact 88 in its corresponding circular depression 84 of lower cover part 52, thereby turning the switch on If the force of depression is removed from the key button, the button and its corresponding moving contact are restored to their initial positions before the turning the switch off.

Figure 7:
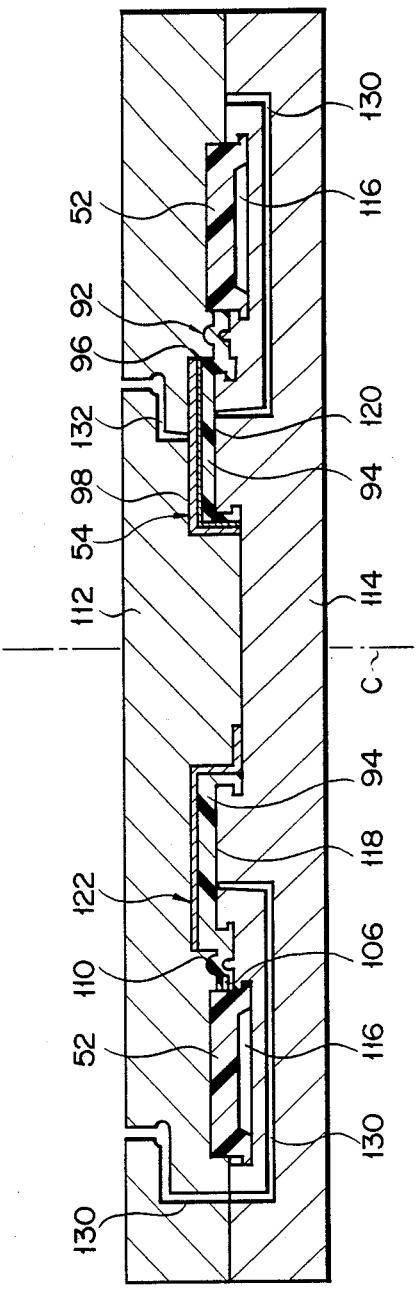
FIG. 7 is a sectional view illustrating a manufacturing process for injection molding, in which upper and lower cover parts of a cover member of the calculator of FIG. 1 are connected for integration.

FIG. 7 shows part of a process for manufacturing cover member 50 of the miniature electronic calculator, according to the first embodiment of the present invention, with the aforementioned construction. In FIG. 7, the configuration of member 50 is illustrated only schematically, for simplicity.

A vertically splittable die s used for this manufacturing process. Upper hall 112 of the die is vertically movable, while lower half 114 is rotatable around center C, within a horizontal plane.

A pair of diametrically symmetrical recesses 116, which are adapted individually to receive separately formed lower cover parts 52, are formed between the respective split surfaces of upper and lower halves 112 and 114. These split surfaces are further formed with primary and secondary recesses 118 and 120 for upper cover part. Recess 118 radally adjoins one of recesses 116 for lower cover part and is designed so that the main body 94 of upper cover part 54 is molded by injection and at the same time ornament layer 96 is deposited on body 94. Recess 120 radially adjoins the other of recesses 116, and is designed so that protection layer 98 is formed, by injection molding, on ornament layer 96 which has been already formed on body 94. The respective lower-half portions of recesses 118 and 120, formed on the split surface of lower half 114 and corresponding to the lower surface of body 94 of each upper cover part 54, are equal in both size and shape. The upper-half portion of recess 118, formed on the split surface of upper half 12, corresponds to the upper surface of body 94 thermal-transfer sheet 122 (which will be described in detail later), formed on ornament layer 96 on the upper surface. The upper-half portion of recess 20, formed also on the split surface of upper half 112, s designed so that protection layer 98 is formed, by injection molding, on ornament layer 96 which has been already formed on body 94. Thus, the respective upper-half portions of recesses 118 and 120 are different& in both size and shape.

Figure 8:
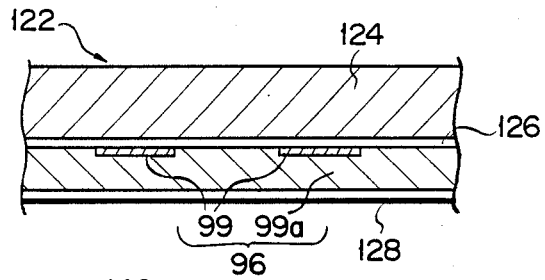
FIG. 8 is an enlarged sectional view of a thermal-transfer sheet for the deposition of an ornament layer, used in the process of FIG. 7.

FIG. 8 is an enlarged sectional view showing part of thermal-transfer sheet 122. Sheet 122 includes base 124 formed of a polyester film and having a thickness of approximately 25 micrometers, separable layer 126 having several micrometers thick and attached to the lower surface of base 124, ornament layer 96 having a thickness of approximately 20 to 30 micrometers and attached to the lower surface of layer 126, and heat-fusible adhesive layer 128 applied to the lower surface of layer 96. Before ornament layer 96 is attached to separable layer 126 which has been already attached to the lower surface of base 124, symbol marks 99 and a background layer 99a are formed on the upper surface of layer 96. Marks 99 are formed by printing and background layer 99a is formed by vacuum deposition or hot stamping. It gets the external appearance of ornament layer 96 to be more gorgeous, because the upper surface of layer 96 is covered with a foil of metal, such as gold, silver, or aluminum. Marks 99 may also be formed by vapor deposition.

There will now be described part of the process for manufacturing cover member 50 of the miniature electronic calculator, according to the first embodiment of the invention, using the die shown in FIG. 7.

(1) After upper half 112 of the die is raised and separated from lower half 114, lower cover part 52, separately formed by means of another die (not shown), is set in right-hand recess 116 (FIG. 7) for lower cover part, which adjoins primary recess 118 for upper cover part. Then, connecting strip 106 (see FIG. 6), previously formed with through holes 108, projects into recess 118.

(2) Flat thermal-transfer sheet 122 is set in primary recess 118 for upper cover part, and upper half 112 of the die is lowered and joined to lower half 114.

(3) Transparent thermoplastic elastomer resin is injected into primary recess 118, through injection hole 130 opening to the bottom surface of recess 118, by means of a material injector (not shown). Thus, body 94 of upper cover part 54 is formed in recess 118. At this time, thermal-transfer sheet 122 is bonded to the upper surface of body 94, by the agency of adhesive layer 128, and outwardly extending strip 110 of part 54 is connected to connecting strip 106 of lower cover part 52. (Primary molding of upper cover part 54)

(4) Upper half 112 is raised to be separated from lower half 114.

(5) Base 124 and separable layer 126 of thermal-transfer sheet 122, bonded on the upper surface of body 94, are peeled off together from ornament layer 96. Thereupon, only layer 96 remains in the upper surface of body 94.

(6) Lower half 114 of the d]e is rotated in a 180-degree arc, and upper half 112 is then lowered and joined again to lower half 114.

(7) In order to cover the surface of ornament layer 96 on body 94 with protection layer 98, material is poured into secondary recess 120 for upper cover part, through injection hole 132 opening to the top surface of recess 120, by means of the material injector. (Secondary molding of upper cover part 54)

Like body 94, protection layer 98 may be formed from elastomer material, such as synthetic resin or thermoplastic elastomer resin. If it is relatively thin, however, layer 98 may be formed from thermosetting resin, such as styrene, polypropylene, or polyester resin, or thermoplastic resen, such as polyvinyl chloride resin.

The injection molding has an advantage such that it can flatten the surface of protection layer 98 even if the layer is relatively thick. If the surface of layer 98 is flat, the course of light transmitted through layer 98 cannot be bent, so that symbol marks 99 formed on the surface of background layer 99a are prevented from looking distorted. Since reflected light from layer 98 adds luster to the colored surface of layer 96, moreover, the calculator of this embodiment can have a more beautiful and gorgeous appearance. The thickness of protection layer 98 is approximately 0.1 millimeter or more, preferably about 0.3 milimeter or more.

The rotary die, used in the manufacturing method described above, is high in manufacturing efficiency, since it can process two upper cover parts 52 at a time, in each of the primary and secondary molding processes.

In the embodiment described above, upper and lower cover parts 54 and 52 are formed independently. Alternatively, however, they may be formed integrally from the same material, by injection molding.

Figure 9:
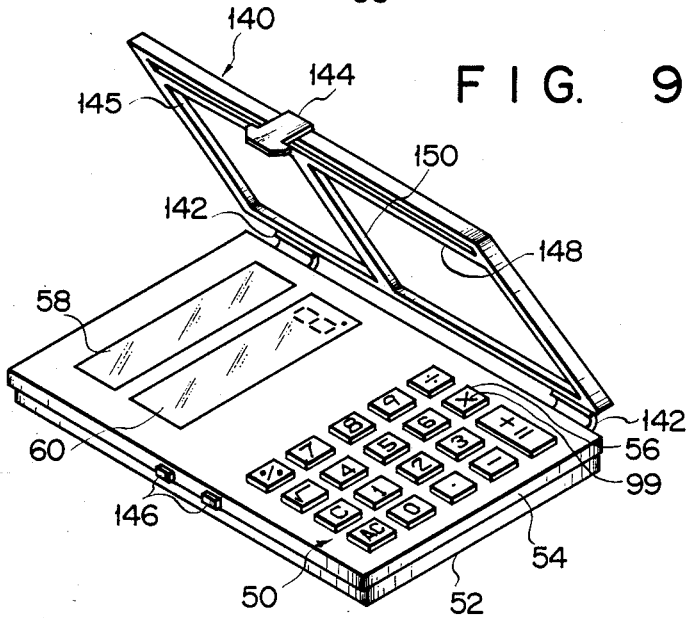
FIG. 9 is a perspective view showing an outline of a miniature electronic calculator according to a second embodiment of the invention, in which a protector cover is located in its open position.

Referring now to FIGS. 9 to 4, a miniature electronic calculator according to a second embodiment of the present invention will be described in detail. In the description to follow, like reference numerals are used to designate like portions as described in connection with the first embodiment, and a detailed description of these portions is omitted.

The calculator of this embodiment is provided with protector cover 140 for protecting, against external force, a plurality of key buttons 56 and transparent windows 58 and 60 for solar cell and liquid crystal display means, mounted on the surface of cover member 50. One longitudinal edge of cover 140 is connected to one longitudinal edge of upper cover part 54 of cover member 50, by means of connecting portion 142. Cover 140, portion 142, and part 54 are formed integrally from flexible material, by injection molding. Independently of these members, lower cover part 52 is formed from rigid synthetic resin. Engaging piece 144 is formed integrally on the other longitudinal edge of protector cover 140, while engaged pieces 146 are formed integrally on the other longitudinal edge of upper cover part 54. As engaging piece 144 e]gages engaged pieces 146, cover 140 is held in its closed position where it covers the upper surface of part 54.

Figure 10:
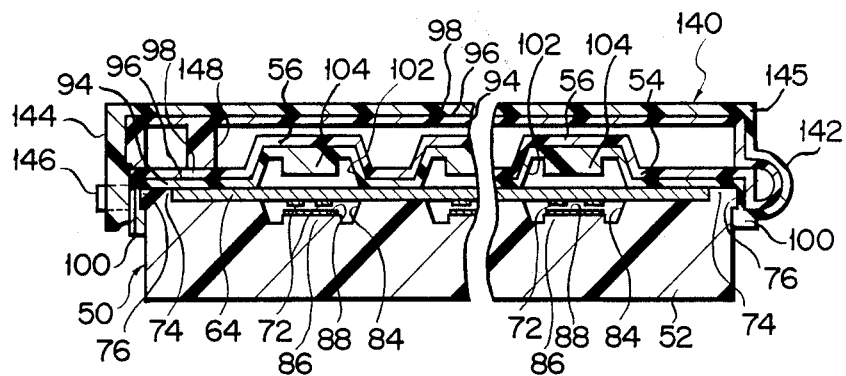
FIG. 10 is a cross-sectional view schematically showing the calculator of FIG. 9, in which the protector cover is located in its closed position.
Figure 11:
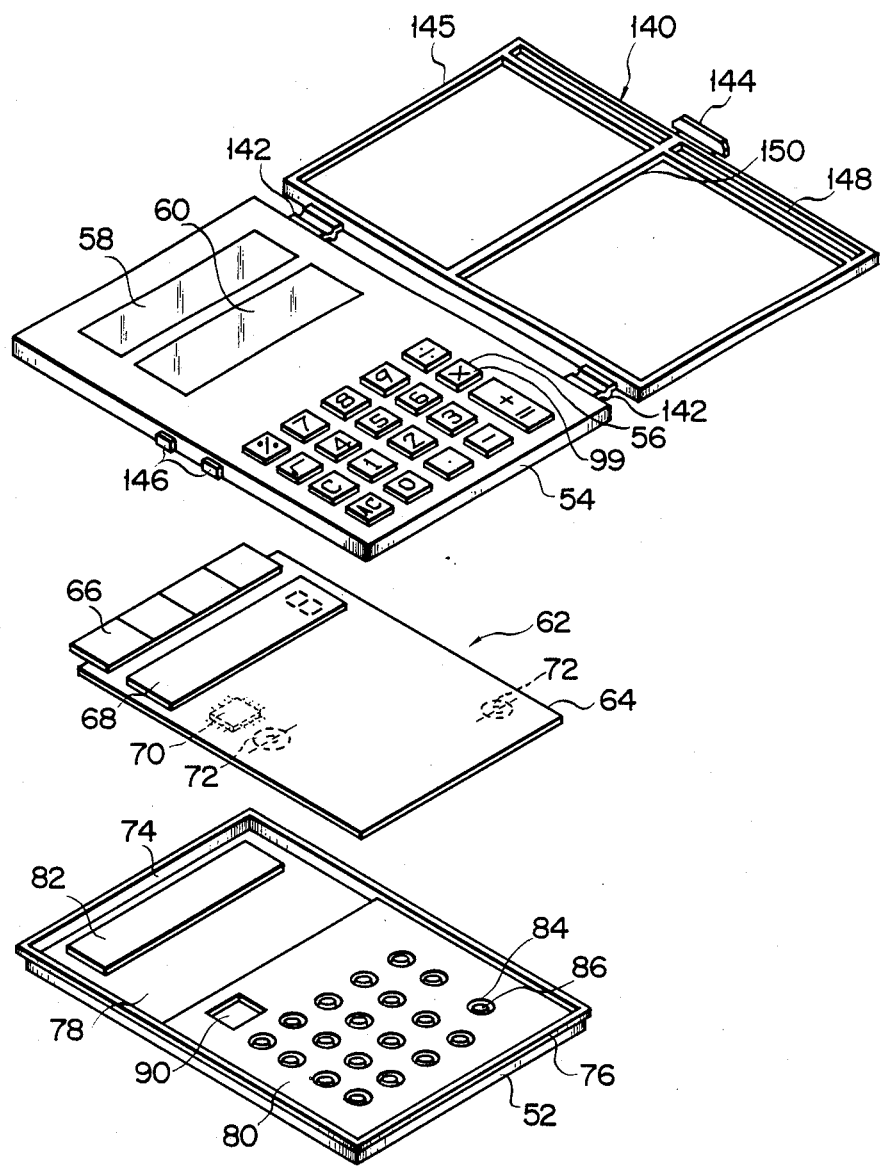
FIG. 11 is an exploded perspective view of the calculator of FIG. 9.
Figure 12:
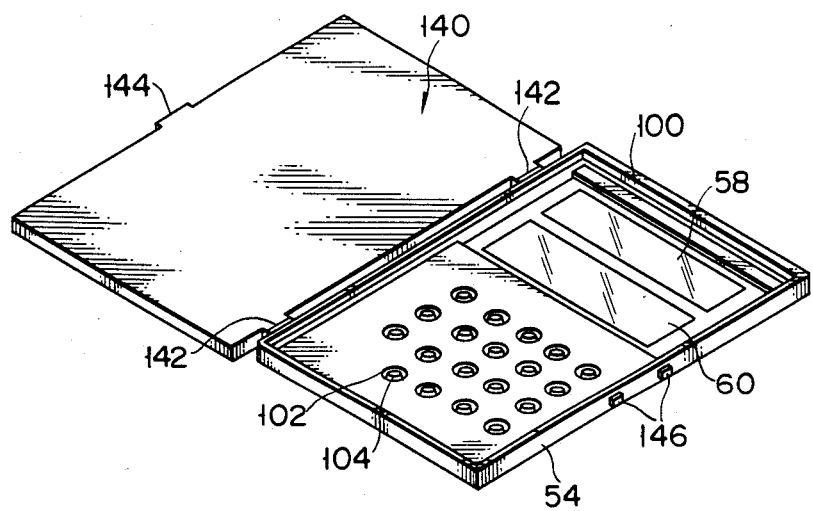
FIG. 12 is a perspective view showing the back of an integral combination of a protector cover and an upper cover part shown in FIG. 11.

As shown in FIGS. 9 to 11, rib 145 is formed on the inner surface of protector cover 40, extending along its peripheral edge. Also, reinforcing ribs 148 and 150, one of which extends along the other longitudinal edge of cover 140 and the other of which extends in the transverse direction of cover 140]are formed on the inner surface of cover 140. When cover 140 is located in its closed position, as shown ].n detail in FIG. 10, ribs 145, 148 and 150 abut against the upper surface of upper cover part 54, thereby preventing the flat surface of cover 140 from being substantially bent inward by external force. Thus, even if the flat surface of cover 140 located at the closed position is subjected to external force, it can damage none of key buttons 56 and transparent windows 58 and 60 mounted on the upper surface of part 54.

Figure 13:
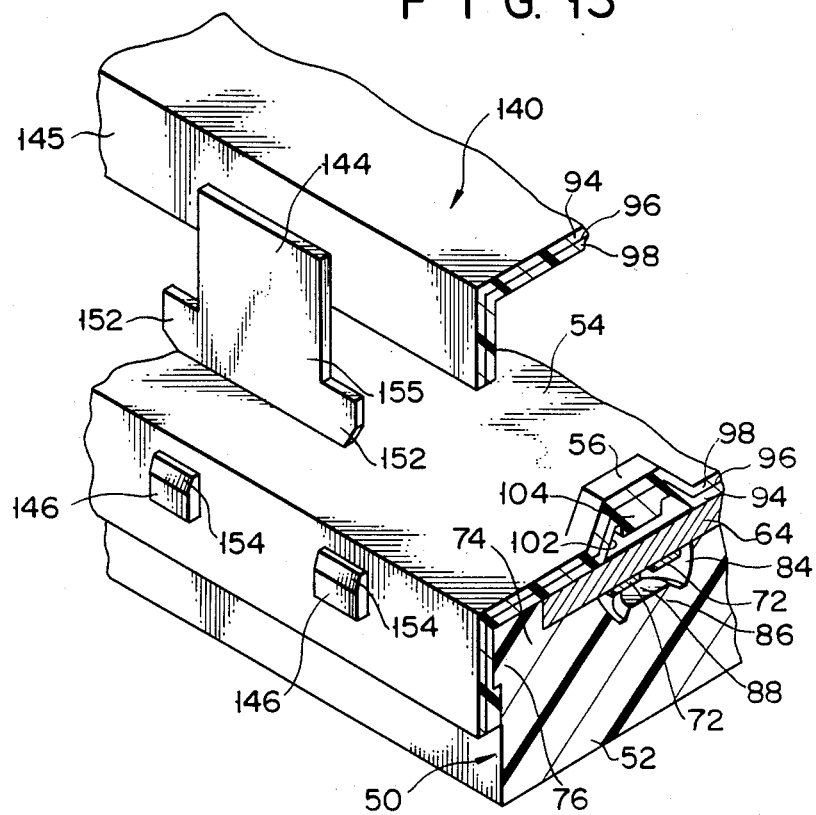
FIG. 13 is an enlarged perspective view, partially in section, showing an engaging piece of the protector cover and engaged pieces of the upper cover part, in the calculator of FIG. 9.

FIG. 13 is an enlarged view showing regions around engaging piece 144 of protector cover 140 and engaged pieces 146 of upper cover part 54]As seen from FIG. 13, piece 144 having inverted-T-shape protrudes downward from the outer side face, which extends along the other longitudinal edge of rib 145, of cover 140. The lower end portion of piece 144 projects right and left. Engaged pieces 146, which are two in number, are rectangular members, formed along the other longitudinal edge on the outer side face of inward protrusion 100 of part 54 so as to engage their corresponding upper edges of lateral projections 152 of piece 144. The upper edge of each piece 146 is chamfered. When cover 140 moves from its open position to its closed position, the lower edges of lateral projections 152 of engaging piece 144 slide on chamfered portions 154 of engaged pieces 146. As a result, downward extending portion 155 of piece 144 bends outward, so that lateral projections 152 can get over their corresponding engaged pieces 146. When the upper edges of lateral projections 152 are located below the lower edges of engaged pieces 146, the outward bend of downward extending portion 154 is canceled. Thus, the upper edges of lateral projections 152 of engaging piece 144 can engage the lower edges of their corresponding engaged pieces 146. The engagement between pieces 144 and 146 can be released by applying external force to lateral projections 152 of engaging piece 144 such that downward extending portion 154 bends outward. Protector cover 140 can be moved from the closed position to the open position if it is subjected to an upward external force.

Figure 14:
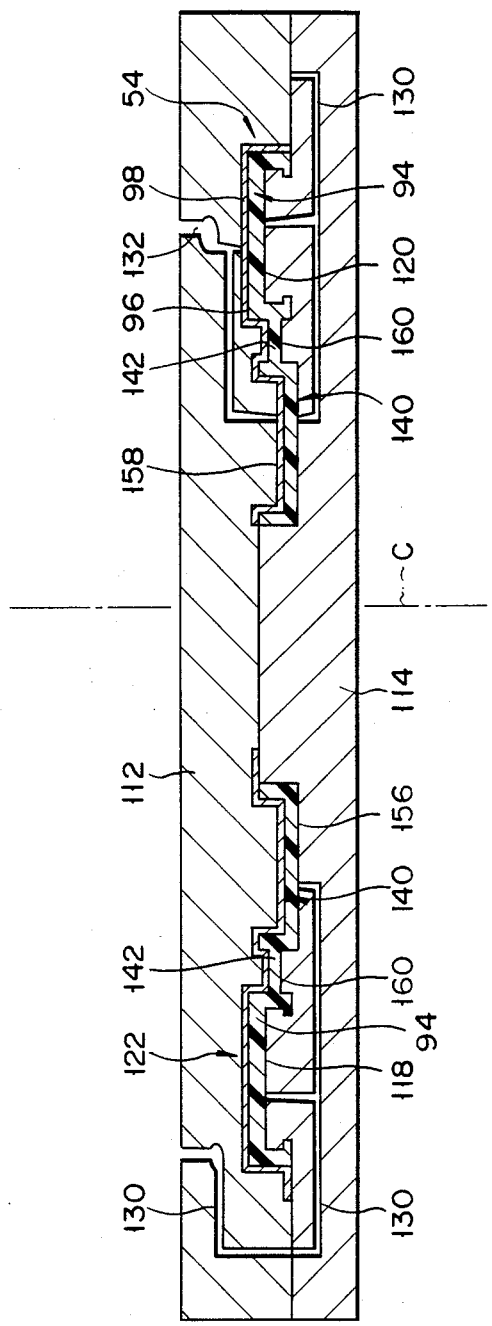
FIG. 14 is a sectional view illustrating part of a process for manufacturing the integral combination of the protector cover and the upper cover part, in the calculator of FIG. 9.
Figure 15:
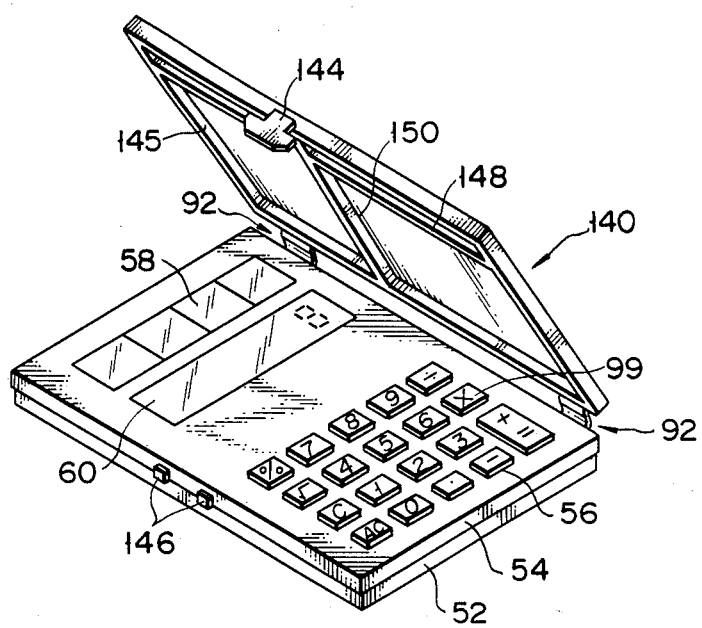
FIG. 15 is a perspective view showing an outline of a miniature electronic calculator according to a third embodiment of the invention, in which a protector cover is located in its open position.
Figure 16:
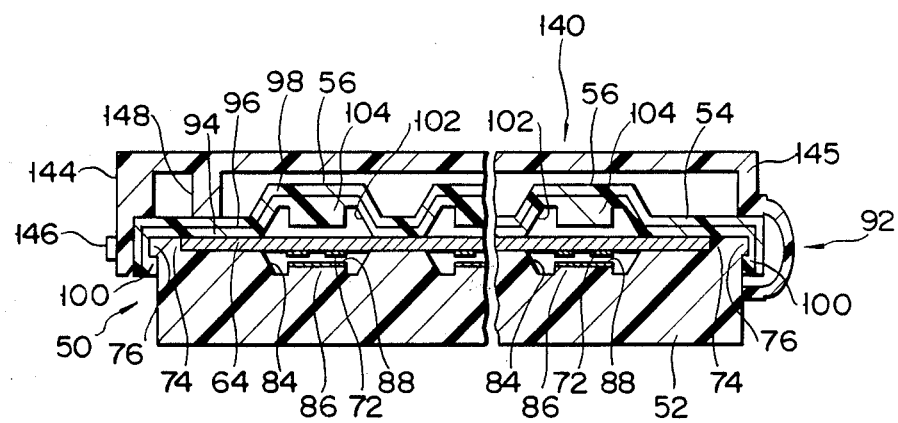
FIG. 16 is a cross-sectional view schematically showing the calculator of FIG. 15, in which the protector cover is located in its closed position.
Figure 17:
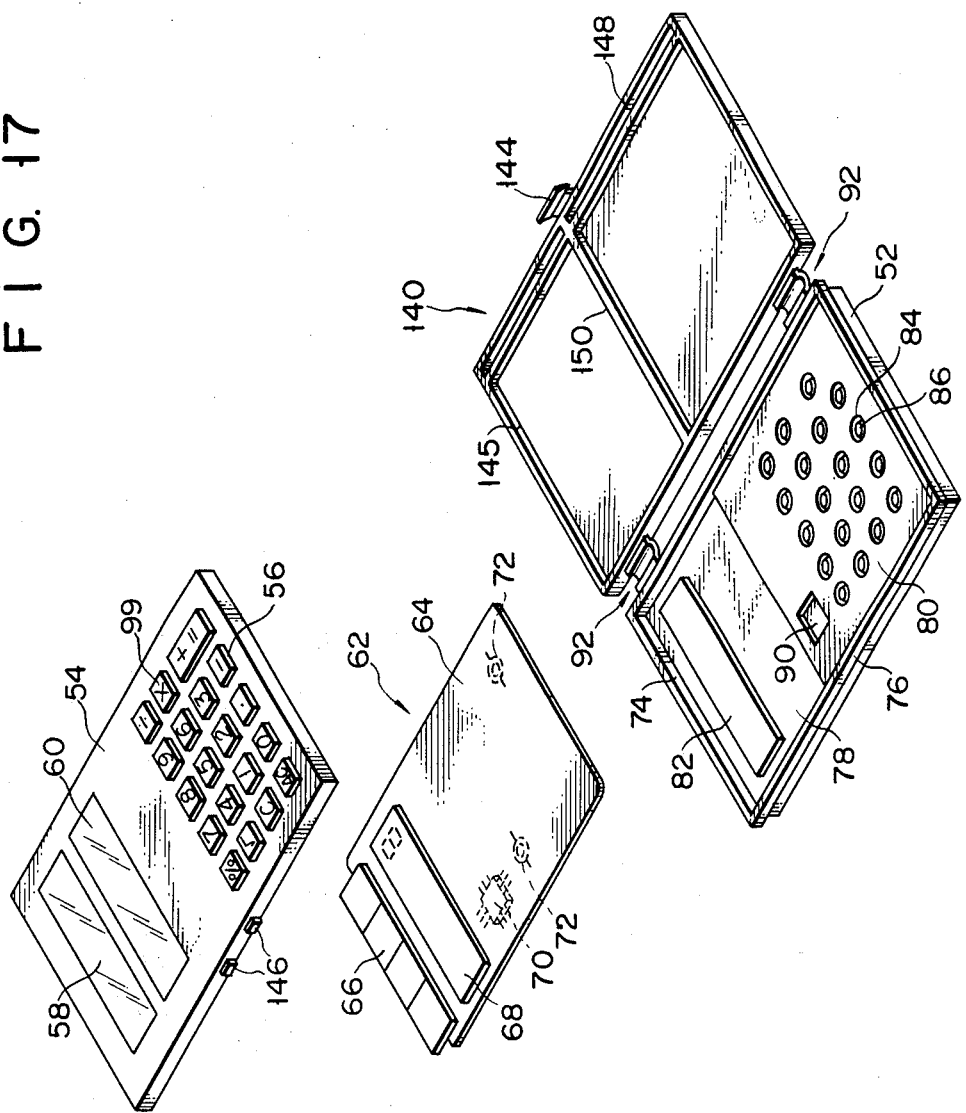
FIG. 17 is an exploded perspective view of the calculator of FIG. 15.
Figure 18:
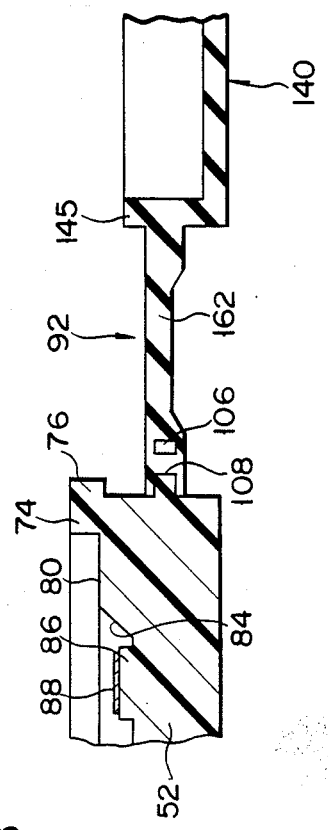
FIG. 18 is an enlarged sectional view schematically showing a connecting strip between a lower cover part and the protector cover, in the calculator of FIG. 15.

FIG. 14 shows part of a process for manufacturing protector cover 140 and upper cover part 54 of the miniature electronic calculator, according to the second embodiment of the present invention, which has the aforementioned construction. Also in this embodiment, a die which can be divided into two halves is used. Upper one 112 of the two halves is vertically movable and lower one 114 is rotatable within a horizontal plane. This die is formed with primary recess 156 for protector cover. Recess 156, which radially adjoins primary recess 118 for upper cover part, is used for forming body 94 of cover 140. Body 94 of cover 140 is formed, along with body 94 of upper cover part 54, by injection molding. Also, recess 156 is used for depositing ornament layer 96 on body 94 of cover 140. The recess is provided in place of recesses 16 for lower cover part, formed in the die for cover member 50 of the first embodiment as shown in FIG. 7. Moreover, the die is formed with secondary recess 158 which radially adjoins secondary recess 120 for upper cover part. Recess 158 is used for forming protection layer 98, by injection molding, on layer 96 which has been already deposited on body 94 of cover 140. Primary recesses 118 and 156 communicate with each other, by means of recess 160 for connecting portion. Secondary recesses 120 and 150 communicate in like manner.

There will now be described the process for manufacturing upper cover part 54 and protector cover 140 of the miniature electronic calculator, according to the second embodiment of the invention, using the die shown in FIG. 14.

(1) After upper half 112 of the die is raised and separated from lower half 114, thermal-transfer sheet 122, shown in FIG. 8, is set in primary recesses 118 and 156 for upper cover part and protector cover, and upper half 112 is lowered and joined to lower half 114.

(2) Transparent thermoplastic elastomer resin is injected into primary recesses 118 and 156, through injection hole 130 opening to the respective bottom surfaces of recesses 118 and 156, by means of a material injector (not shown). Thus, common body 94 of upper cover part 54 and protector cover 140 is formed in recesses 118 and 156. At this time, thermal-transfer sheet 122 is bonded to the upper surface of body 94, by the agency of adhesive layer 128. (Primary molding of upper cover part 54 and protector cover 140).

(3) Upper half 112 is raised to be separated from lower half 114.

(4) Base 124 and separable layer 126 of thermal-transfer sheet 122 are peeled off together from ornament layer 96 which has been already bonded on the upper surface of body 94. Thereupon, only layer 96 remains on the upper surface of body 94.

(5) Lower half 114 of the de is rotated in a 180-degree arc, and upper half 112 is then lowered and joined again to half 114.

(6) In order to cover the surface of ornament layer 96 on body 94 with protection layer 98, transparent resin, preferably thermoplastic elastomer resin, is poured into secondary recesses 120 and 158, for upper cover part and protector cover, through injection hole 132 opening to the respective top surfaces of recesses 120 and 158, by means of the material injector. (Secondary molding of upper cover part 54 and protector cover 140).

The miniature electronic calculator according to the second embodiment of the invention, constructed in the aforementioned manner, can provide the following advantages, as well as those of the calculator according to the first embodiment. Namely, key buttons 56 and transparent windows 58 and 60 for solar cell and liquid crystal display means can be protected merely against external force, by protector cove& 142. Moreover, cover 140, along with connecting portions 142, is formed integrally with upper cover part 54 of cover member 50, by injection molding. Thus, the calculator has a simple construction, and can be manufactured and assembled with ease.

Referring now to FIGS. 15 to 19, a miniature electronic calculator according to a third embodiment of the present invention will be described in detail. In the description to follow, like reference numerals are used to designate like portions as described in connection with the first and second embodiments, and a detailed description of these portions is omitted.

In the third embodiment, protector cover 140 is connected to lower cover part 52 of cover member 50 by means of connecting portions 92. Cover 140 is formed from a soft material, while part 52 is formed from a rigid material in order to maintain the strength of part 52, and more specifically, to secure the strength for improved reliability of key input operation. Outwardly extending pieces 162 (FIG. 18) of protector cover 140 are connected integrally to their corresponding connecting pieces 106 (FIG. 18) of part 52 by forming cover 140 with injection molding, so that cover 140 adjoins part 52 which has been formed independently beforehand by injection molding. In the third embodiment, moreover, upper cover part 54, which &s expected to look gorgeous, is formed independently of protector cover 140 and lower cover part 52. Therefore, cover 140 and part 52 can be each formed only o a body structure of a single colored material, without using ornament layer 96 and protection layer 98. For higher manufacturing efficiency, moreover, cover 140 and part 52 may be formed at the same time, from the same material, by injection molding. In this case, the material used may be a soft material, such as rubber, thermoplastic elastomer resin, or thermoplastic synthetic resin, or a rigid material, such as polypropylene.

Figure 19:
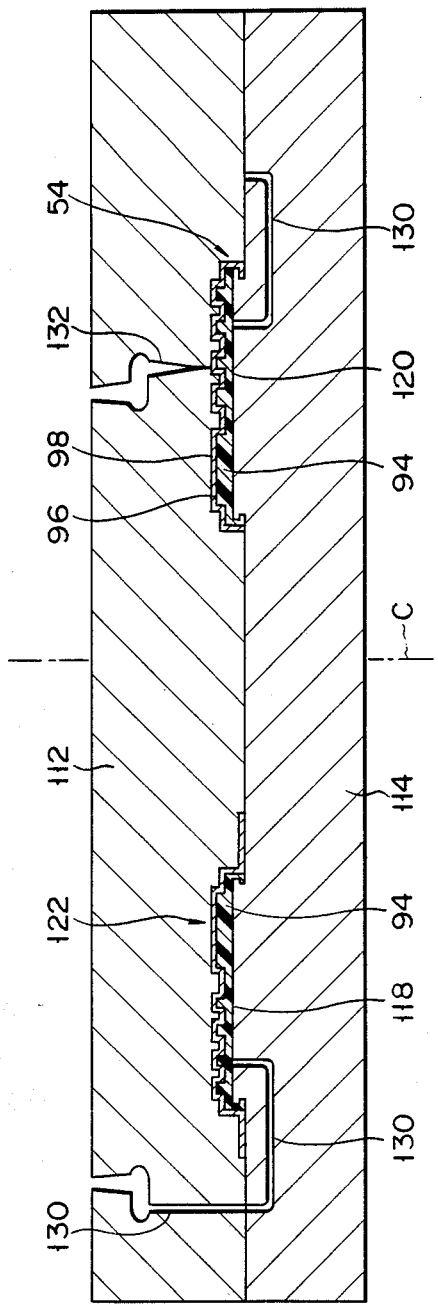
FIG. 19 is a sectional view schematically illustrating part of a process for manufacturing an upper cover part of the calculator of FIG. 15.
Figure 20:
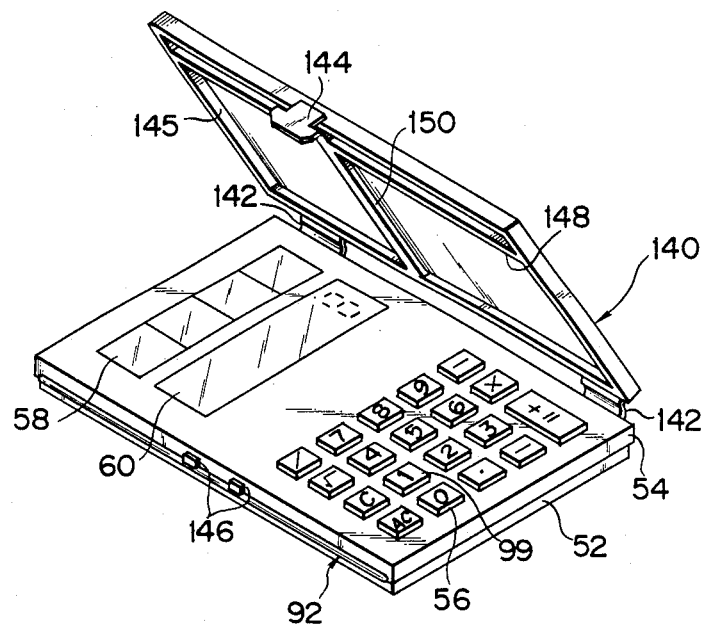
FIG. 20 is a perspective view showing an outline of a miniature electronic calculator according to a fourth embodiment of the invention, in which a protector cover is located in its open position.
Figure 21:
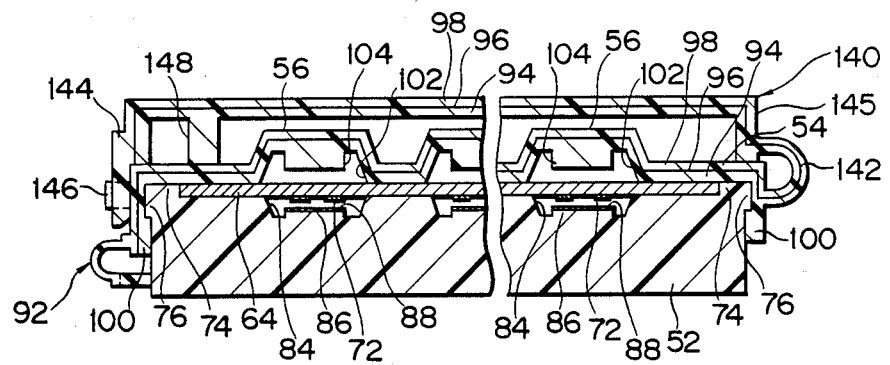
FIG. 21 is a cross-sectional view schematically showing the calculator of FIG. 20 in which the protector cover is located in its closed position.
Figure 22:
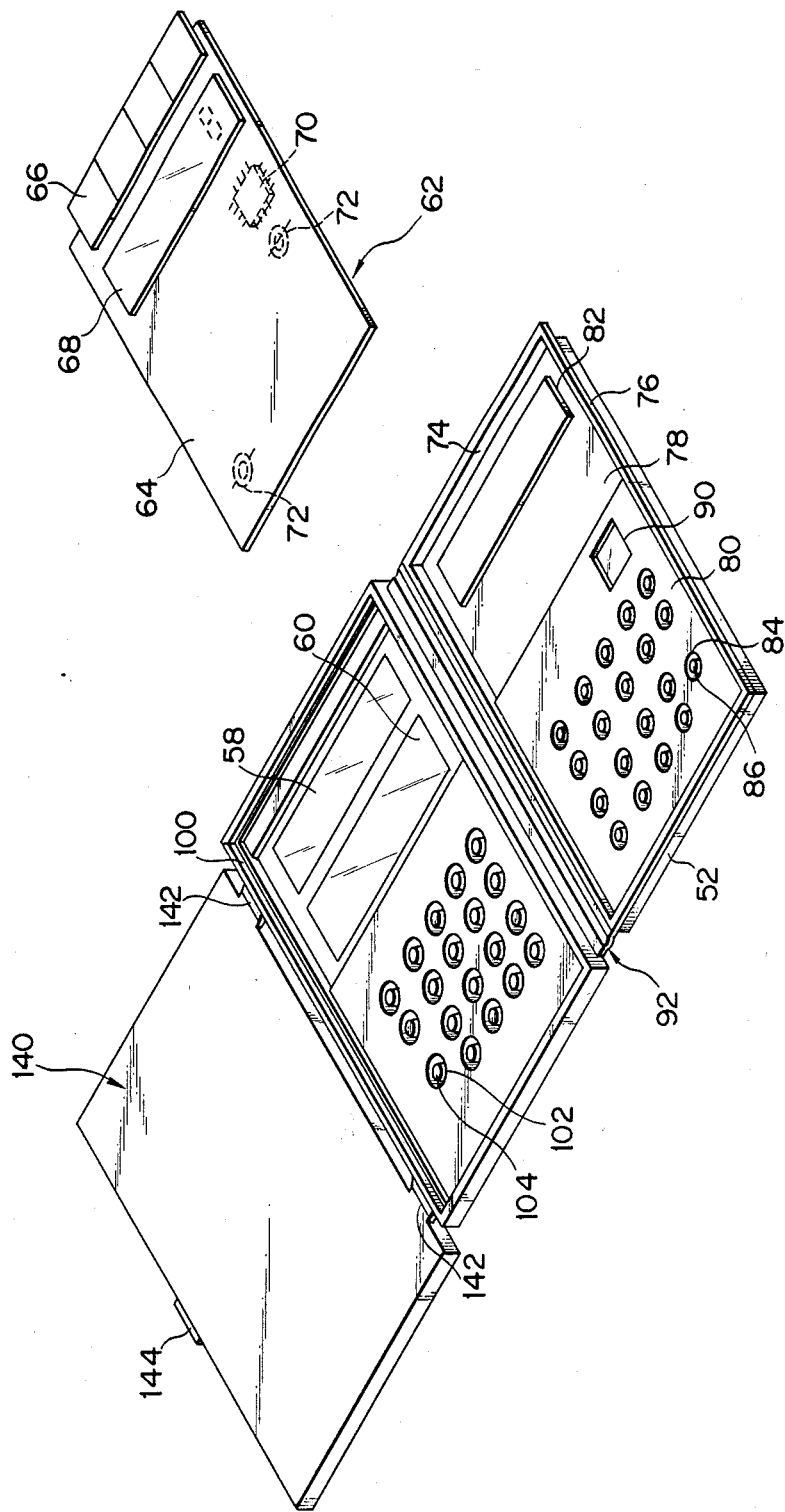
FIG. 22 is an exploded perspective view of the calculator of FIG. 20.
Figure 23:
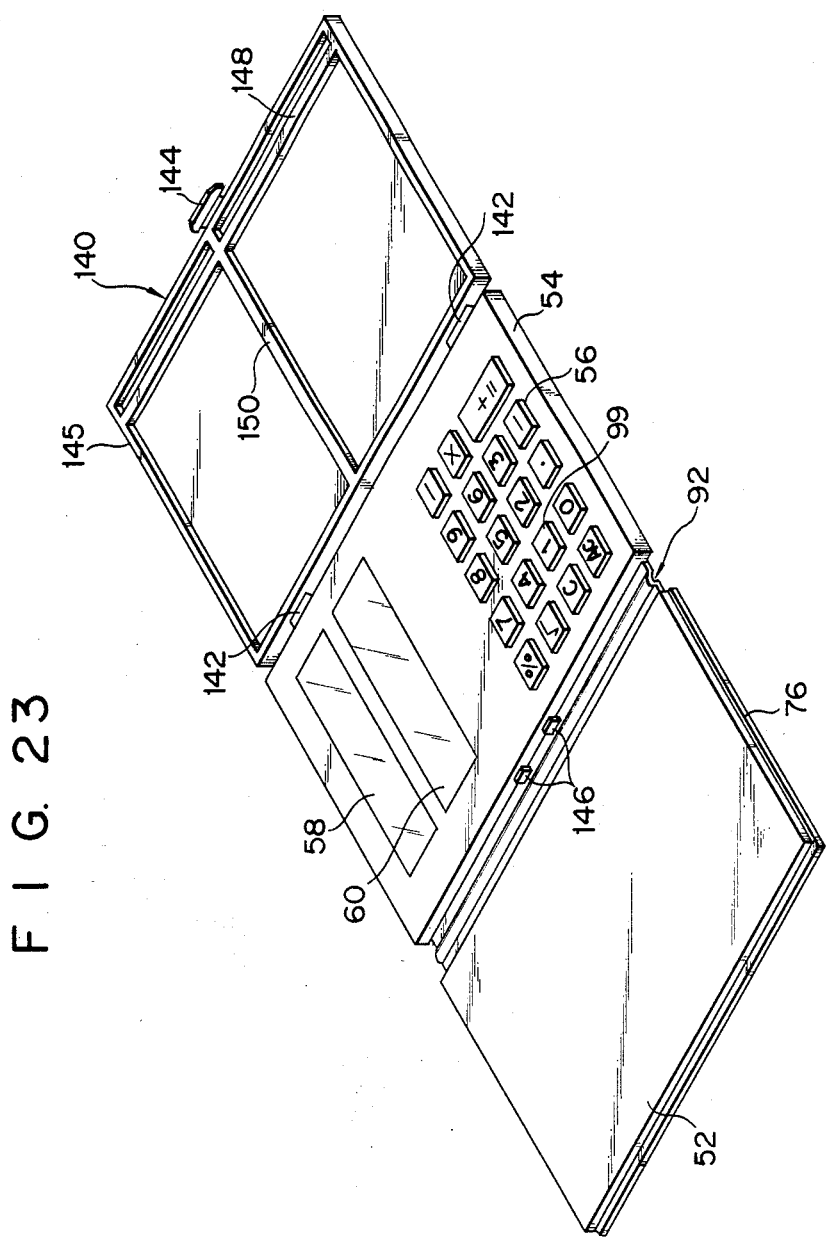
FIG. 23 is a perspective view showing the back side of a protector cover and upper and lower cover parts, connected integrally to one another, in the calculator of FIG. 22.
Figure 24:
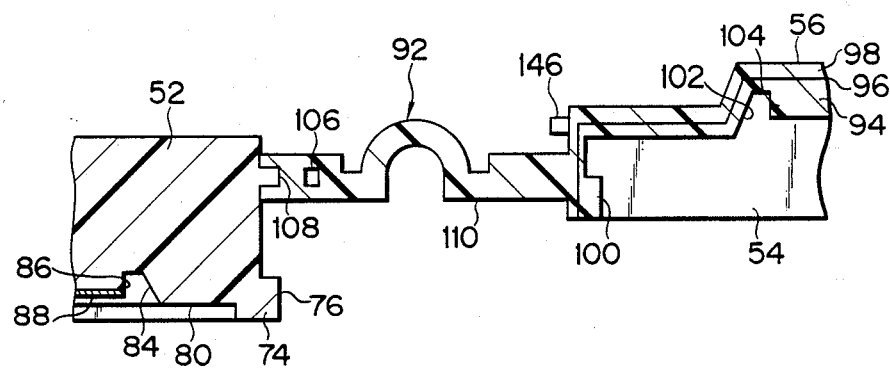
FIG. 24 is an enlarged sectional view showing a connecting portion between the upper and lower cover parts, in the calculator of FIG. 22.
Figure 25:
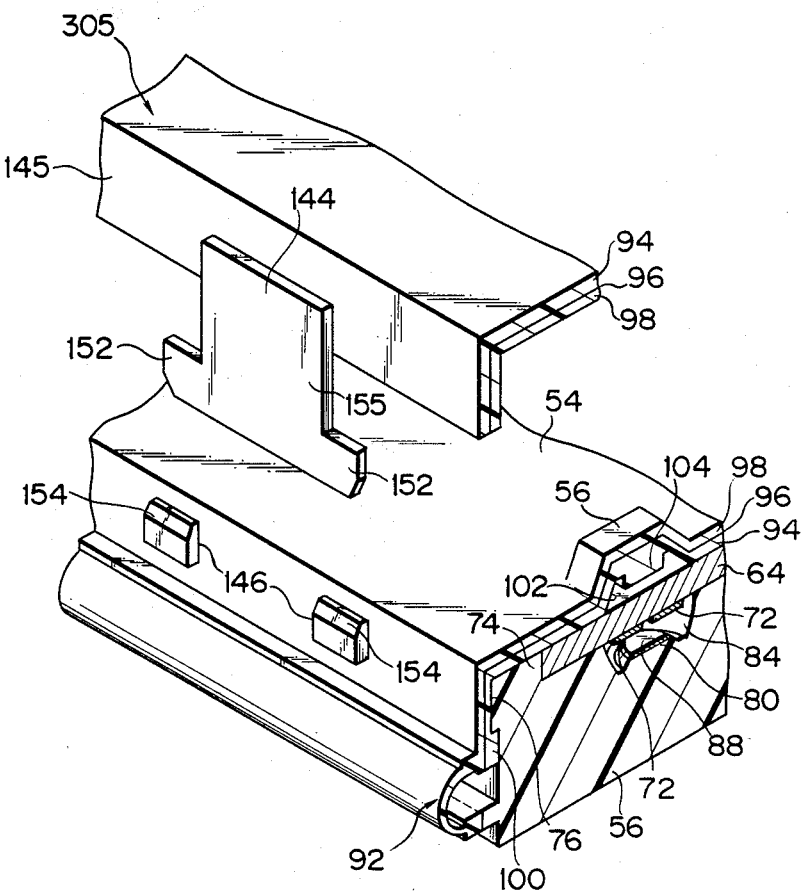
FIG. 25 is an enlarged perspective view, partially in section, schematically showing an engaging piece of the protector cover and engaged pieces of the upper cover part, in the calculator of FIG. 22.

FIG. 19 shows a die used in the injection molding of upper cover part 54 of the third embodiment. This die is also composed of vertically movable upper half 112 and lower half 114 which is rotatable within a horizontal plane. The die is formed with primary and secondary recesses 118 and 120 for upper cover part, arranged diametrically symmetrically. Recess 118 is used for molding body 94 of upper cover part 54 by injection, and for depositing thermal-transfer sheet 122 on the upper surface of body 94. Recess 120 is used for forming protection layer 98 on layer 96 which has been already formed on body 94, by injection molding.

The manufacture of upper cover part 54 of the third embodiment is performed as follow by using the die shown in FIG. 19.

(1) After upper half 112 of the die is raised and separated from lower half 114, thermal-transfer sheet 122 is set in primary recess 118 {or upper cover part.

(2) Upper half 112 is lowered and joined to lower half 114.

(3) Transparent thermoplastic elastomer resin is injected into primary recess 118, through injection hole 130 opening to the bottom surface of recess 118, by means of a material injector (not shown). Thus, body 94 of upper cover part 54 is formed in recess 118. At this time, thermal-transfer sheet 122 is bonded to the upper surface of body 94, by &he agency of adhesive layer 128. (Primary molding of upper cover part 54).

(4) After upper half 112 is raised to be separated from lower half 114, base 124 and separable layer 126 of thermal-transfer sheet 122 are peeled off together from ornament layer 96 which has been already formed on the upper surface of body 94. Thereupon, only layer 96 remains on the upper surface of body 94.

(5) Lower half 114 of the die is rotated in a 180-degree arc, and upper half 112 is then lowered and joined again to half 114.

(6) In order to cover the surface of ornament layer 96 formed on body 94 with protection layer 98, transparent resin, preferably thermoplastic elastomer resin, is poured into secondary recess 120 for upper cover part, through injection hole 132 opening to the top surface of recess 120, by means of the material injector. (Secondary molding of upper cover part 54).

The miniature electronic calculator according to the third embodiment, described above, is assembled as follows.

Preassembled printed-circuit board unit 62 is put on the inner surface of lower cover part 52, surrounded by rising 74, and unit 62 is then covered with upper cover part 54. Inward protrusion 100 of upper half part 54 is caused to engage outward protrusion 76 of lower half part 52, so that parts 52 and 54 are fixed together. In doing this, screws or a bonding agent or adhesive may be used as required. Protector cover 140 is turned around connecting portions 92 to cover the upper surface of part 54, on which are arranged key buttons 56 and transparent windows 58 and 60 for solar cell and liquid crystal display means. Thereafter, engaging piece 144 of cover 140 is caused to engage engaged pieces 146 of part 54, so that cover 140 is held in its closed position.

Referring now to FIGS. 20 to 26, a miniature electronic calculator according to a fourth embodiment of the present invention will be described in detail. In the description to follow, like reference numerals are used to designate like portions as described in connection with the first to third embodiments, and a detailed description of these portions is omitted.

In the fourth embodiment, protector cover 140 and upper and lower cover parts 54 and 52 are injection-molded, so as to be connected integrally with one another, without using any independent connecting member. Cover 140 and part 54 are formed from one and the same material, while part 52 s formed from another material.

FIG. 26 shows part of a process for manufacturing protector cover 140 and upper and lower cover parts 54 and 52 of the miniature electronic calculator, according to the fourth embodiment. Also i]this embodiment, a die is used which can be divided &into two halves. Upper one 112 of the two halves is vertically movable, and lower one 114 is rotatable within a horizontal plane. This die is formed with a pair of diametrically symmetrical recesses 116, which are adapted individually to receive separately formed lower cover parts 52. The die is also formed with primary recess 118 for upper cover part. Primary recess 118 radially adjoins one of recesses 116, and is used for molding body 94 of upper cover part 54 by injection and for depositing thermal-transfer sheet 122 for ornament layer 96 on body 94. Further, the die is formed with second recess 120 for upper cover part. Second recess 20 radially adjoins the other of recesses 116, and is used for forming protection layer 98, by injection molding, on layer 96 which has been already formed on body 94. Furthermore, the die is formed with primary recess 156 for protector cover. Recess 156, which radially adjoins recess 118, is used for forming body 94 of protector cover 140 by injection molding and for depositing thermal-transfer sheet 122 on body 94. Moreover, the die is formed with secondary recess 158 for protector cover. Recess 158 radially adjoins recess 120, and s used for forming protection layer 98, by injection]molding, on layer 96 which has been already formed on body 94.

The manufacture of protector cover 140 and upper and lower cover parts 54 and 52 o{the fourth embodiment of the present invention is performed as follows by using the die shown in FIG. 26.

(1) After upper half 112 of the die is raised and separated from lower half 114, lower cover part 52, separately formed from rigid synthetic resin by means of another die (not shown), is set in that recess 116 for lower cover part, which adjoins primary recess 118 for upper cover part. Then, connecting strip 106 (see FIG. 24) of part 52, previously formed with through holes 108, projects into recess 118.

(2) Flat thermal-transfer sheet 122 is set in primary recesses 118 and 156 for upper cover part and protector cover, and upper half 112 of the die is lowered and joined to lower half 114.
112 of the die is lowered and joined to lower half 114.

(3) Transparent thermoplastic elastomer resin is injected into primary recesses 112 and 156, through injection hole 130 opening to the respective bottom surfaces of recesses 118 and 156, by means of a material injector (not shown. Thus, respective bodies 94 of upper cover part 54 and protector cover 140 are formed in recesses 118 and 156. At this time, thermal-transfer sheet 122 is bonded to the upper surfaces of bodies 94 of part 54 and cover 140, by the agency of adhesive layer 128, and outwardly extending strip 110 of part 54 is connected to connecting strip 106 of lower cover part 52. (Primary molding of upper cover part 54 and protector cover 140).

(4) Upper half 112 is raised to be separated from lower half 114.

(5) Base 124 and separable ayer 126 of thermal-transfer sheet 122, are peeled off together from ornament layer 96 which has been already formed on the upper surface of body 94. Thereupon, only layer 96 remains on the upper surface of body 94.

(6) Lower half 114 of the die is rotated in a 180-degree arc, and upper half 11& is then lowered and joined again to half 114.

(7) In order to cover the surface of ornament layer 96, which has been already formed on bodies 94 of upper cover part 54 and protector cover 140, with protection layer 98, transparent resin is poured into secondary recesses 120 and 158 for upper cover part and protector cover, through injection hole 132 opening to the respective top surfaces of recesses 120 and 158, by means of the material injector. Secondary molding of upper cover part 54 and protector cover 140).

The miniature electronic calculator according to the fourth embodiment, described above, is assembled as follows.

Preassembled printed-circuit board unit 62 is put on the inner surface of lower cover part 52, surrounded by wall 74. After upper cover part 54 is turned around connecting portion 92 to cover unit 62 with part 54, inward protrusion 100 of part 54 is caused to engage outward protrusion 76 of part 52, so that parts 52 and 54 are fixed together. In doing this, screws or a bonding agent or adhesive may be used as required. Then, protector cover 140 is turned around connecting portions 142 to cover the upper surface of part 54, on which are arranged key buttons 56 and transparent windows 58 and 60 for solar cell and liquid crystal display means. Thereafter, engaging piece 144 of cover 140 is caused to engage engaged pieces 146 of part 54, so that cover 140 is held in its closed position.

What is claimed is:

1. A case structure for an electronic apparatus adapted to house an electronic component assembly having two opposed surfaces and including a circuit board with a plurality of key contacts, display means and an IC chip, comprising:
   a lower cover member, including a main body with a side edge, said lower cover member covering one of said surfaces of said electronic component assembly and having a connection portion coupled to said side edge and protruding away from said main body of the lower cover member;
   an upper cover member formed of molded elastomeric material and including a plurality of depressible protections, and a deformable portion movable between a normal position and a deformed position, and having an end molded on said connection portion of said lower cover member, said depressible projections having key symbol marks, respectively, on an outer surface thereof;
   wherein said upper cover member being beside the lower cover member when the deformable portion is in its normal position, and said upper cover member being on top of the lower cover member in an assembled position when the deformable portion is in its deformed position, and wherein in the assembled position said upper cover member is disposed over the other of said surfaces of said electronic component assembly and the plurality of depressible projections respectively face each of said key contacts.

2. A case structure according to claim 1, wherein said upper cover member includes an uppermost substrate made of transparent thermoplastic elastomer and an ornament layer laminated on said uppermost substrate.

3. A case structure according to claim 2, wherein said upper cover member includes a lower substrate made of thermoplastic elastomer laminated on said uppermost substrate and said ornament layer.

4. A case structure according to claim 1, wherein said lower cover member is made of rigid plastic material.

5. A case structure according to claim 4, wherein said lower cover member includes a plurality of fixed contacts attached to a surface of said lower cover member spaced from and adapted to face said key contacts of sad circuit board, respectively.

6. A case structure according to claim 1, further including a protective cover member molded to said upper cover member.

7. A case structure according to claim 6, wherein said protective cover member includes a main substrate made of transparent material and an ornament layer laminated on said main substrate.

8. A case structure according to claim 6, wherein said protective cover member includes engaging means for securing said protective cover member to said lower cover member.

9. A case structure according to claim 11, wherein said upper and lower cover members include engaging means for securing one to the other.

10. A deformable ornamental body for an electronic apparatus, comprising:
    a first deformable substrate formed of transparent thermoplastic elastomeric material;
    a second deformable substrate formed or transparent thermoplastic elastomeric material, said first and second deformable substrates being fixed relative to one another, and at least one of said first and second deformable substrates having engaging means for securing it to said electronic apparatus; and
    a deformable colored ornamental layer formed of including a metal layer sandwiched between said first and second deformable substrates.

11. A deformable ornamental body according to claim 10, wherein said first deformable substrate has a thickness of more than 0.3 mm.

* * * * *